(12) United States Patent
Jones et al.

(10) Patent No.: US 10,885,349 B2
(45) Date of Patent: Jan. 5, 2021

(54) METHOD AND APPARATUS FOR IMAGE PROCESSING

(71) Applicant: OXEHEALTH LIMITED, Oxford (GB)

(72) Inventors: Simon Mark Chave Jones, Oxford (GB); Nicholas Dunkley Hutchinson, Oxford (GB)

(73) Assignee: OXEHEALTH LIMITED, London (GB)

( * ) Notice: Subject to any disclaimer, the term of this patent is extended or adjusted under 35 U.S.C. 154(b) by 55 days.

(21) Appl. No.: 16/347,925

(22) PCT Filed: Nov. 7, 2017

(86) PCT No.: PCT/GB2017/053343
§ 371 (c)(1),
(2) Date: May 7, 2019

(87) PCT Pub. No.: WO2018/087528
PCT Pub. Date: May 17, 2018

(65) Prior Publication Data
US 2019/0294888 A1 Sep. 26, 2019

(30) Foreign Application Priority Data

Nov. 8, 2016 (GB) .................................. 1618828.6

(51) Int. Cl.
*G06K 9/00* (2006.01)
*G06K 9/62* (2006.01)
*G06T 7/246* (2017.01)

(52) U.S. Cl.
CPC ....... *G06K 9/00771* (2013.01); *G06K 9/6247* (2013.01); *G06T 7/246* (2017.01);
(Continued)

(58) Field of Classification Search
CPC .. G06K 9/00771; G06K 9/6247; G06T 7/246; G06T 2207/10024; G06T 2207/10048;
(Continued)

(56) References Cited

U.S. PATENT DOCUMENTS 7,133,537 B1 * 11/2006 Reid ..................... G06T 7/254
382/103
8,855,384 B2   10/2014 Kyal et al.
(Continued)

FOREIGN PATENT DOCUMENTS

EP      0615245 A2   9/1994
EP      0919184 A1   6/1999
(Continued)

OTHER PUBLICATIONS

Beleznai et al, "Multiple Object Tracking Using Local PCA", 2006, The 18th International Conference on Pattern Recognition (ICPR'06), 4 pages (Year: 2006).*
(Continued)

*Primary Examiner* — David F Dunphy
(74) *Attorney, Agent, or Firm* — Harness, Dickey & Pierce, P.L.C.

(57) ABSTRACT

A method and apparatus for detecting fine movement of a subject in video images, and for distinguishing over noise and other image artefacts. The video images are processed to detect movement of image features through the sequence and to calculate how spatially distributed those moving features are across the image. The movement tracks of the features may be subject to principal component analysis and a spatial dispersion measure calculated by the product of the distance between tracked image features and the contributions of those image features to the most significant principal components. If the spatial dispersion measure is high then this is indicative of feature movement being dispersed
(Continued)

Figure 1:
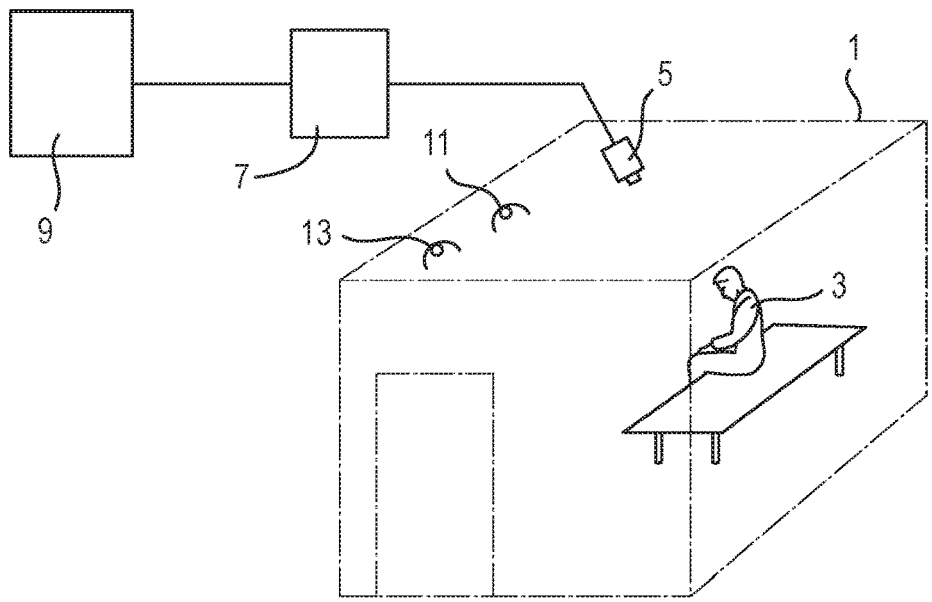

widely across the image, whereas if it is low, it is indicative of the main feature movements being concentrated in one part of the image, and thus more likely to represent subject movement than noise.

24 Claims, 7 Drawing Sheets

(52) U.S. Cl.
CPC ............... *G06T 2207/10024* (2013.01); *G06T 2207/10048* (2013.01); *G06T 2207/20164* (2013.01); *G06T 2207/30196* (2013.01); *G06T 2207/30232* (2013.01); *G06T 2207/30241* (2013.01)

(58) Field of Classification Search
CPC . G06T 2207/20164; G06T 2207/30196; G06T 2207/30232; G06T 2207/30241
See application file for complete search history.

(56) References Cited

U.S. PATENT DOCUMENTS

| | | | |
|---|---|---|---|
| 8,965,090 B1 | 2/2015 | Khachaturian et al. | |
| 9,036,877 B2 | 5/2015 | Kyal et al. | |
| 10,034,979 B2 | 7/2018 | Bechtel et al. | |
| 10,292,662 B2 | 5/2019 | Kirenko | |
| 2002/0106709 A1 | 8/2002 | Potts et al. | |
| 2002/0180870 A1 | 12/2002 | Chen | |
| 2003/0138149 A1 | 7/2003 | Iizuka et al. | |
| 2003/0228032 A1 | 12/2003 | Rui et al. | |
| 2005/0197590 A1 | 9/2005 | Osorio et al. | |
| 2006/0058618 A1 | 3/2006 | Nishiura | |
| 2007/0156060 A1 | 7/2007 | Cervantes | |
| 2007/0195931 A1 | 8/2007 | Ohishi | |
| 2008/0292151 A1 | 11/2008 | Kurtz et al. | |
| 2009/0216499 A1 | 8/2009 | Tobola et al. | |
| 2009/0312985 A1* | 12/2009 | Eliazar ................... G06N 20/00 702/187 | |
| 2010/0045799 A1* | 2/2010 | Lei .......................... G06T 7/254 348/169 | |
| 2010/0049064 A1 | 2/2010 | Bodmer et al. | |
| 2010/0074475 A1 | 3/2010 | Chouno | |
| 2010/0298656 A1 | 11/2010 | McCombie et al. | |
| 2011/0046498 A1 | 2/2011 | Klap et al. | |
| 2011/0150274 A1 | 6/2011 | Patwardhan et al. | |
| 2011/0251493 A1 | 10/2011 | Poh et al. | |
| 2011/0311143 A1 | 12/2011 | Cennini et al. | |
| 2012/0141000 A1 | 6/2012 | Jeanne et al. | |
| 2012/0213405 A1 | 8/2012 | Sasaki | |
| 2012/0242819 A1 | 9/2012 | Schamp | |
| 2013/0138009 A1 | 5/2013 | Nierenberg et al. | |
| 2013/0324875 A1 | 12/2013 | Mestha et al. | |
| 2013/0330060 A1* | 12/2013 | Seidel ..................... G06T 17/10 386/280 | |
| 2014/0003690 A1 | 1/2014 | Razeto et al. | |
| 2014/0023235 A1 | 1/2014 | Cennini et al. | |
| 2014/0037163 A1 | 2/2014 | Kirenko et al. | |
| 2014/0037166 A1 | 2/2014 | De Haan et al. | |
| 2014/0236036 A1 | 8/2014 | de Haan et al. | |
| 2014/0276099 A1 | 9/2014 | Kirenko et al. | |
| 2014/0276104 A1 | 9/2014 | Tao et al. | |
| 2014/0334697 A1 | 11/2014 | Kersten et al. | |
| 2014/0371599 A1 | 12/2014 | Wu et al. | |
| 2014/0371635 A1 | 12/2014 | Shinar et al. | |
| 2014/0378842 A1 | 12/2014 | Xu et al. | |
| 2015/0005646 A1 | 1/2015 | Balakrishnan et al. | |
| 2015/0063708 A1 | 3/2015 | Sripadarao et al. | |
| 2015/0148687 A1 | 5/2015 | Kitajima et al. | |
| 2015/0208987 A1 | 7/2015 | Shan et al. | |
| 2015/0221069 A1 | 8/2015 | Shaburova et al. | |
| 2015/0250391 A1 | 9/2015 | Kyal et al. | |
| 2015/0363361 A1 | 12/2015 | Kniazev | |
| 2016/0106340 A1 | 4/2016 | Mestha et al. | |
| 2016/0125260 A1 | 5/2016 | Huang et al. | |
| 2016/0132732 A1 | 5/2016 | Gunther et al. | |
| 2016/0220128 A1 | 8/2016 | Den Brinker et al. | |
| 2016/0253820 A1 | 9/2016 | Jeanne et al. | |
| 2016/0310067 A1 | 10/2016 | Heinrich et al. | |
| 2017/0007185 A1 | 1/2017 | Lin et al. | |
| 2017/0042432 A1 | 2/2017 | Adib et al. | |
| 2017/0224256 A1 | 8/2017 | Kirenko | |
| 2017/0238805 A1 | 8/2017 | Addison et al. | |
| 2017/0238842 A1 | 8/2017 | Jacquel et al. | |
| 2018/0053294 A1* | 2/2018 | Rastgar ............ G06K 9/00369 | |
| 2018/0085010 A1 | 3/2018 | Jones et al. | |
| 2018/0279885 A1 | 10/2018 | Bulut | |
| 2019/0000391 A1 | 1/2019 | De Haan et al. | |
| 2019/0267040 A1 | 8/2019 | Ikeda et al. | |

FOREIGN PATENT DOCUMENTS

| | | |
|---|---|---|
| EP | 1571594 A2 | 9/2005 |
| EP | 2767233 A1 | 8/2014 |
| EP | 2976998 A1 | 1/2016 |
| EP | 2988274 A2 | 2/2016 |
| EP | 3073905 A1 | 10/2016 |
| EP | 3207862 A1 | 8/2017 |
| JP | 2011130996 A | 7/2011 |
| WO | WO-2010/100593 A1 | 9/2010 |
| WO | WO-2010/115939 A2 | 10/2010 |
| WO | WO-2011021128 A2 | 2/2011 |
| WO | WO-2013027027 A2 | 2/2013 |
| WO | WO-2014131850 A1 | 4/2014 |
| WO | WO-2014125250 A1 | 8/2014 |
| WO | WO-2014140994 A1 | 9/2014 |
| WO | WO-2015049150 A1 | 4/2015 |
| WO | WO-2015055709 A1 | 4/2015 |
| WO | WO-2015/078735 A1 | 6/2015 |
| WO | WO-2015/091582 A1 | 6/2015 |
| WO | WO-201504915 A1 | 8/2015 |
| WO | WO-2015172735 A1 | 11/2015 |
| WO | WO-2016092290 A1 | 6/2016 |
| WO | WO-2016094749 A1 | 6/2016 |
| WO | WO-2016159151 A1 | 10/2016 |
| WO | WO-2017125743 A1 | 7/2017 |
| WO | WO-2017125744 A1 | 7/2017 |
| WO | WO-2017125763 A1 | 7/2017 |

OTHER PUBLICATIONS

U.S. Appl. No. 16/732,769, filed Jan. 2, 2020, Nicholas Dunkley Hutchinson.
U.S. Appl. No. 16/732,979, filed Jan. 2, 2020, Nicholas Dunkley Hutchinson.
U.S. Appl. No. 16/733,065, filed Jan. 2, 2020, Nicholas Dunkley Hutchinson.
U.S. Appl. No. 15/961,279, filed Apr. 24, 2018, Nicholas Dunkley Hutchinson.
U.S. Appl. No. 16/071,542, filed Jul. 20, 2018, Nicholas Dunkley Hutchinson.
U.S. Appl. No. 16/071,570, filed Jul. 20, 2018, Simon Mark Chave Jones.
U.S. Appl. No. 16/071,591, filed Jul. 20, 2018, Muhammad Fraz.
U.S. Appl. No. 16/071,611, filed Jul. 20, 2018, Nicholas Dunkley Hutchinson.
U.S. Appl. No. 16/291,728, filed Mar. 4, 2019, Nicholas Dunkley Hutchinson.
U.S. Appl. No. 16/334,211, filed Mar. 18, 2019, Mohamed Elm ikaty.
Kumar-DistancePPG: Robust non-contact vital signs monitoring using a camera, Optical Society of America (2015).
Pisani-Real-time Automated Detection of Clonic Seizures in Newborns, Clinical Neurophysiology 125 (2014) 1533-1540.
Verkruysse-Remote Plethysmographic Imaging using Ambient Light, Optics Express (Dec. 22, 2008) vol. 16, No. 26.
International Preliminary Report on Patentability regarding Application No. PCT/GB2017/053343 dated May 14, 2019.

(56) References Cited

OTHER PUBLICATIONS

Nathalie M. el Nabbout et al, "Automatically Detecting and Tracking People Walking through a Transparent Door with Vision", Computer and Robot Vision, 2008. CRV '08. Canadian Conference on, IEEE, Piscataway, NJ, USA, May 28, 2008 (May 28, 2008), pp. 171-178.
Qiang Zhu et al, "Learning a Sparse, Corner-Based Representation for Corner-Based Representation for Time-varying Background Modeling", Computer Vision, 2005. ICCV 2005. Tenth IEEE International Conference on Beijing, China Oct. 17-20, 2005, Piscataway, NJ, USA, IEEE, Los Alamitos, CA, USA, vol. 1, Oct. 17, 2005 (Oct. 17, 2005), pp. 678-685.
Konstantinos Avgerinakis et al, "Activity detection and recognition of daily living events", Proceedings of the 1st ACM International Workshop on Multimedia Indexing and Information Retrieval for Healthcare, MIIRH '13, Oct. 22, 2013 (Oct. 22, 2013), pp. 1-7.
Arindam Sikdar et al, "Computer-Vision-Guided Human Pulse Rate Estimation: A Review", IEEE Reviews in Biomedical Engineering, vol. 9, Sep. 16, 2016 (Sep. 16, 2016), pp. 91-105.
Yu Sun et al,"Photoplethysmography Revisited: From Contact to Noncontact, From Point to Imaging", IEEE Transactions on Biomedical Engineering, IEEE Service Center, Piscataway, NJ, USA, vol. 63, No. 3, Mar. 1, 2016 (Mar. 1, 2016), pp. 463-477.
Tongchi Zhou et al, "A study of relative motion point trajectories for action recognition", 2015 International Conference on Wireless Communications & Signal Processing (WCSP), IEEE, Oct. 15, 2015 (Oct. 15, 2015), pp. 1-5.
Hisato Aota et al, "Extracting objects by clustering of full pixel trajectories", Signal Processing and Multimedia Applications (SIGMAP), Proceedings of the 2010 International Conference on, IEEE, Jul. 26, 2010 (Jul. 26, 2010), pp. 65-72.
Shandong Wu et al, "A hierarchical motion trajectory signature descriptor", 2008 IEEE International Conference on Robotics and Automation. The Half-Day Workshop on: Towards Autonomous Agriculture of Tomorrow, IEEE—Piscataway, NJ, USA, Piscataway, NJ, USA, May 19, 2008 (May 19, 2008), pp. 3070-3075.
Search Report for GB Application No. 1618828.6, dated Mar. 31, 2017.
International Search Report and Written Opinion for PCT/GB2017/053343, dated Jan. 4, 2018; ISA/EP.
International Search Report and Written Opinion for PCT/GB2017/052779, dated Nov. 10, 2017; ISA/EP.
Search Report for GB Application No. 1615899.0, dated Feb. 28, 2017.
International Preliminary Report on Patentability and Written Opinion regarding Application No. PCT/GB2017/052779 dated Mar. 19, 2019.
International Search Report for PCT/GB2017/050162, ISA/EP, Rijswijk, NL, dated Jul. 6, 2017.
Written Opinion of the ISA for PCT/GB2017/050162, ISA/EP, Rijswijk, NL, dated Jul. 6, 2017.
Search Report for Priority Application GB1601140.5, UK IPO, Newport, South Wales, dated Jul. 21, 2016.
International Search Report for PCT/GB2017/050127, ISA/EP, Rijswijk, NL, dated Mar. 28, 2017.
Written Opinion of the ISA for PCT/GB2017/050127, ISA/EP, Rijswijk, NL, dated Mar. 28, 2017.
UK IPO Search Report under Section 17(5) for priority application GB1061143.9, dated Mar. 30, 2016.
International Search Report for PCT/GB2017/050128, ISA/EP, Rijswijk, NL, dated Apr. 13, 2017.
Written Opinion of the ISA for PCT/GB2017/050128, ISA/EP, Rijswijk, NL, dated Apr. 13, 2017.
Search Report under Section 17(5) for priority application GB1601142.1, UKIPO, Newport, South Wales, dated Jun. 28, 2016.
Tarassenko et al, "Non-contact video-based vital sign monitoring using ambient light and auto-regressive models", 2014 Physiol. Meas. 35 807, pp. 807-831.
Wu et al, Eulerian Video Magnification for Revealing Subtle Changes in the World, 2012.
International Search Report for PCT/GB2017/050126, ISA/EP, Rijswijk, NL, dated Apr. 20, 2017.
Written Opinion of the ISA for PCT/GB2017/050126, ISA/EP, Rijswijk, NL, dated Apr. 20, 2017.
UK IPO Search Report for GB priority application 1601217.1, Newport, South Wales, dated Jul. 25, 2016.
Search Report regarding United Kingdom Patent Application No. GB1706449.4, dated Oct. 25, 2017.
Amelard Robert et al. "Illumination-compensated non-contact imaging photoplethysmography via dual-mode temporally coded illumination". Progress in Biomedical Optics and Imaging, SPIE—International Society for Optical Engineering, Bellingham, WA, US., vol. 9316, Mar. 5, 2015.
Blocker Timon et al, "An online PPGI approach for camera based heart rate monitoring using beat-to-beat detection", 2017 IEEE Sensors Applications Symposium (SAS), IEEE, Mar. 13, 2017.
Extended European Search Report regarding application No. 18168310.3-1115 dated Oct. 1, 2018.
European Search Report regarding Application No. EP 19 15 8085 dated Jul. 10, 2019.
Nakajima, Kazuki, Yoshiaki Matsumoto, and Toshiyo Tamura. "Development of real-time image sequence analysis for evaluating posture change and respiratory rate of a subject in bed." Physiological Measurement 22.3 (2001).
Search Report of UKIPO regarding Application No. GB1900033.0 dated Jun. 13, 2019.
British Search Report regarding Application No. 1900034.8 dated Jun. 13, 2019.
Extended EP Search Report regarding Application No. 19220090.5 dated Feb. 24, 2020.

\* cited by examiner

METHOD AND APPARATUS FOR IMAGE PROCESSING

CROSS REFERENCE TO RELATED APPLICATIONS

This application is a U.S. National Phase Applications under 35 U.S.C. 371 of International Application No. PCT/GB2017/053343 filed on Nov. 7, 2017. This application claims priority to British Application No. 1618828.6 filed on Nov. 8, 2016. The entire disclosures of all of the above applications are incorporated herein by reference.

The present invention relates to a method and apparatus for image processing, and in particular for processing video images.

The automatic analysis and processing of video images, in particular to extract useful information, is of interest in a wide variety of fields. For example, in the field of monitoring the health or welfare of subjects (human or animal for example) proposals have been made for monitoring the subject with a video camera and analysing the video images to detect the vital signs (such as heart rate, breathing rate, blood oxygen saturation) of the subject. Such analysis may be based on the PPGi signal in the image as in WO-A2-2013/027027 or on detecting fine movement associated with breathing or heart beat or a combination of the two. In the health and security monitoring fields proposals have also been made for detecting and classifying the gross movement of subjects in a video image as dangerous or non-dangerous, for example the proposal for detecting clonic seizures as described in the paper "Real-time automated detection of clonic seizures in newborns" by Pisani et al.

However a problem common to such fields is distinguishing between the signals of interest and artefacts caused by other effects. For example, in the case of detecting fine movement of a subject (the type of small distance movement associated with breathing, heart beat, natural trembling or unconscious movement of the body), which may be as small as such as sub-pixel movements, pixel noise from the image sensor may confound the detection. Small movements, such as insects moving in the scene may also be present, and illumination changes can cause problems. In the security field the inability to distinguish the signal of interest may result in many false alarms, and thus an alarm eventually being ignored, or in a threshold for triggering an alarm being set high, and then failing to detect intruders. In the health or welfare monitoring field, similar problems of excessive false alarms with low trigger thresholds or lack of alarm with high trigger thresholds also arise.

The present invention provides a method of determining whether a video image of a scene contains movement of a subject within the scene by assuming that movement the video image is generated from a mixture of an underlying set of "hidden" movement sources which cannot be directly inferred from the pixel values of the video and to retrieve each of these movement sources and a measure of their spatial extents across the video image—or "spatial dispersions". This can be achieved by:
1) detecting movement in the video,
2) describing that movement as a set of signals
3) optionally processing the signals if necessary, e.g. by signal conditioning, for the next step,
4) blindly separating the movement sources in this set of signals; and
5) determining the spatial extent of these movement sources.

In more detail, according to the present invention there is provided a method of determining whether a video image of a scene contains movement of a subject within the scene, comprising the steps of:
acquiring a sequence of image frames forming the video image;
detecting movement of a plurality of image features through the sequence of image frames to form a corresponding plurality of movement signals;
analysing the movement signals to find related movement signals, these being signals analysed as likely to relate to the same movement source;
calculating a spatial dispersion measure for the related movement signals, the spatial dispersion measure representing the spatial dispersion in the image of the related movement signals;
comparing the lowest of the calculated spatial dispersion measures with a predetermined first threshold, and if it is lower than the predetermined first threshold determining that video image as containing subject movement.

The spatial dispersion measure therefore looks at whether the movement signals (i.e. the change with time in position in the image frame of detected image features) which are strong contributors to movement are spread-out over the image frame (high spatial dispersion) or concentrated in one area (low spatial dispersion). High spatial dispersion is more suggestive of the presence of noise or image artefact, whereas low spatial dispersion is more indicative of subject movement.

The step of analysing the movement signals to find related movement signals may comprise analysing the movement signals using a blind signal separation method such as principal component analysis, independent component analysis or clustering.

The step of detecting movement of a plurality of image features through the sequence of image frames may comprise detecting a plurality of image features within each image frame and tracking the position of the plurality of image features through the sequence of image frames to form a corresponding plurality of track signals constituting said movement signals. The track signals may be the x and y coordinates of the features or the principal components of each feature's movement.

Alternatively the step of detecting movement of a plurality of image features through the sequence of image frames may comprise superpixel detection and tracking or dense optical flow analysis.

The step of analysing the movement signals to find related movement signals may comprise finding analytically-similar movement signals, such as temporally-similar movement signals, that it is to say with common movement frequency content and it may comprise finding the strength of the common components of the movement signals, and clustering or grouping them in accordance with the movement frequency content.

Related track signals may also be found by performing a standard clustering process such as K-means clustering, spectral clustering or matrix or hierarchical clustering.

Alternatively principal component analysis may be used to find related track signals. In more detail, the method may comprise analysing the movement signals to find principal components of the plurality of movement signals and determining for each obtained principal component the score of each movement signal for that principal component.

The step of calculating a spatial dispersion measure for the related movement signals may comprise for each of a plurality of the most significant of the obtained principal components calculating the spatial dispersion measure representing the spatial dispersion in the image of the movement signals with a strong score for that principal component.

The step of comparing the lowest of the calculated spatial dispersion measures with a predetermined first threshold may comprise comparing the lowest of the spatial dispersion measures of the said plurality of principal components with a predetermined first threshold, and if it is lower than the predetermined first threshold determining that video image as containing subject movement.

The spatial dispersion measure for each principal component may be calculated from the scores for each movement signal for that principal component and a distance in the video image between the movement signals contributing to that principal component.

The spatial dispersion measure for a principal component may be calculated from a product of the scores for each movement signal for the principal component and a distance in the image between the movement signals.

The spatial dispersion measure for each principal component may be calculated by, for a plurality of different pairs of the movement signals, calculating the product of the scores from each of the pair of movement signals for that principal component and a distance in the video image between the pair of movement signals.

The spatial dispersion measure for each principal component may be calculated by calculating the sum of all the products of the scores from each of the pair of movement signals for that principal component and a distance in the video image between the pair of movement signals, and dividing it the sum by the sum of all the scores for each of the pair of movement signals for that principal component.

The distances in the image between the movement signals are preferably one of: the average over the sequence of image frames of the distance between the image features forming the movement signals, the distance in a predetermined frame of the sequence between the image features forming the movement signals. For example the predetermined frame may be one of: the last frame, the middle frame, the first frame.

I an alternative embodiment the step of analysing the movement signals to find related movement signals comprises performing clustering on the movement signals and the spatial dispersion measure is calculated for each cluster.

The method of the invention may further comprised the step of conditioning the movement signals before the step of analysing the movement signals to find related movement signals. The step of conditioning the movement signals may comprise at least one of noise reduction and removing non-linear trends. For example, the step of conditioning the movement signals may comprise at least one of smoothing the movement signals to reduce pixel noise and differentiating the movement signals to remove non-linear trends.

The invention also provides an apparatus for analysing video image in accordance with the method above, the apparatus comprising a video image processor programmed to execute the method on an input video image. The apparatus may be part of a video monitoring system including a video camera to capture video images and a display to display the captured video together with the results of the image analysis. This may form part of a health or welfare monitoring system or a security monitoring system.

The video camera is preferably a standard digital video camera so that the video image sequence is a conventional frame sequence with each frame comprising an array of pixel intensities. The camera may be monochrome or may be a colour camera providing pixel intensities in the red, green and blue channels.

Thus this aspect of the invention may provide apparatus for monitoring a subject in a room to provide status or alerting of a subject's condition, the apparatus comprising: a video camera configured to capture a video image sequence of the room; a data processor configured to automatically process the video image sequence to determine whether a video image of a scene contains movement of a subject within the scene in accordance with the method above; and a display or other output device which under the control of the data processor outputs a visible or audible indication of the determination.

The invention may be embodied in a signal processing method, or in a signal processing apparatus which may be constructed as dedicated hardware or by means of a programmed general purpose computer or programmable digital signal processor. The invention may also be embodied in a computer program for processing a captured video image sequence in accordance with the invention and for outputting the resulting determination. Thus this aspect of the invention may provide a computer program comprising program code means for executing on a computer system the processing of a captured video image sequence of a scene to automatically determine whether the video image sequence contains movement of a subject within the scene, the method being in as described above.

The invention will be further described by way of non-limitative example with reference to the accompanying drawing in which: —

Figure 2:
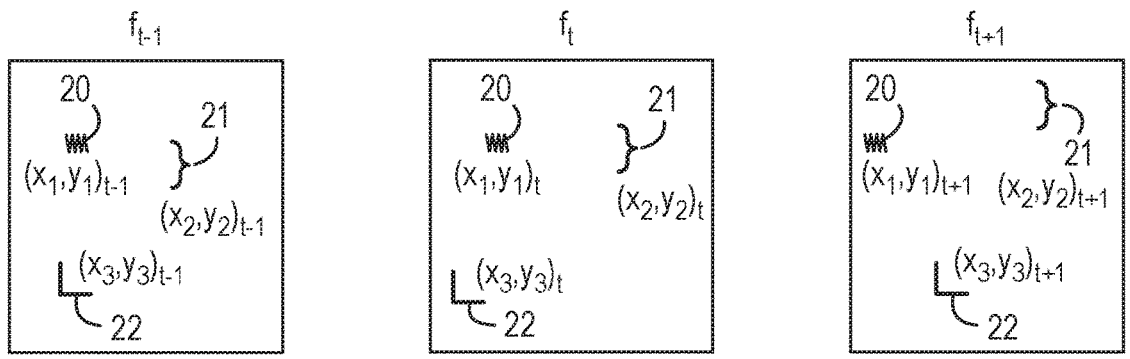
Figure 3:
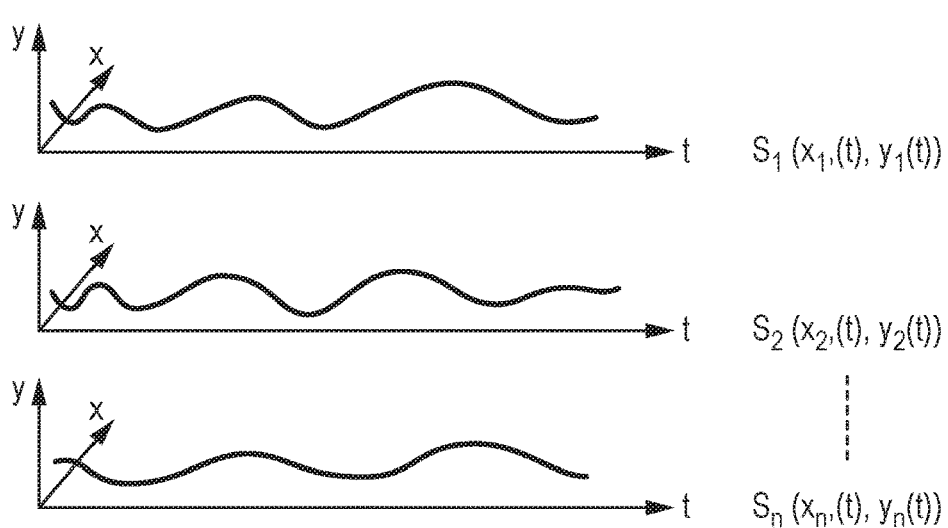
Figure 4:
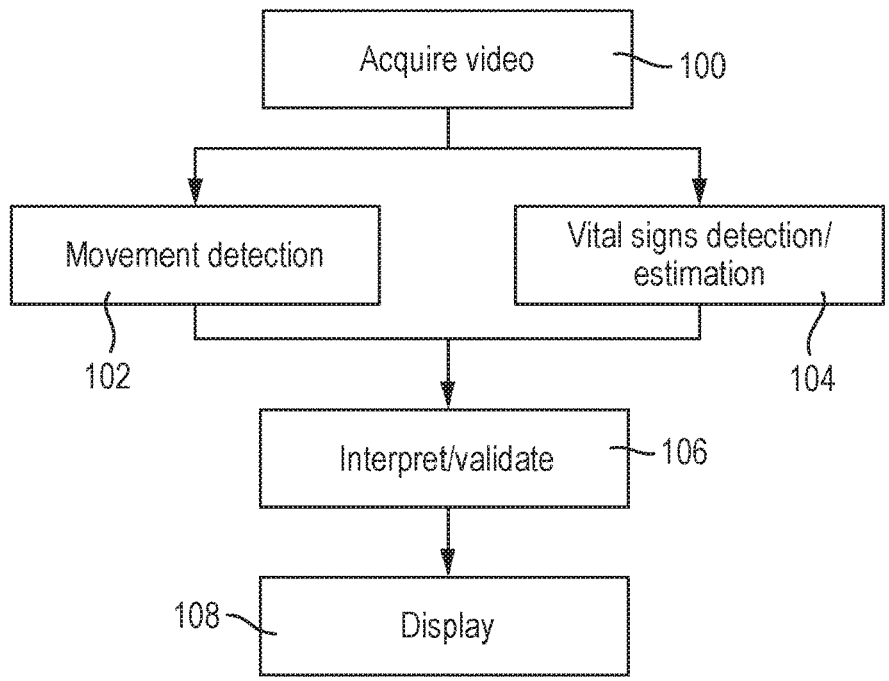
Figure 5:
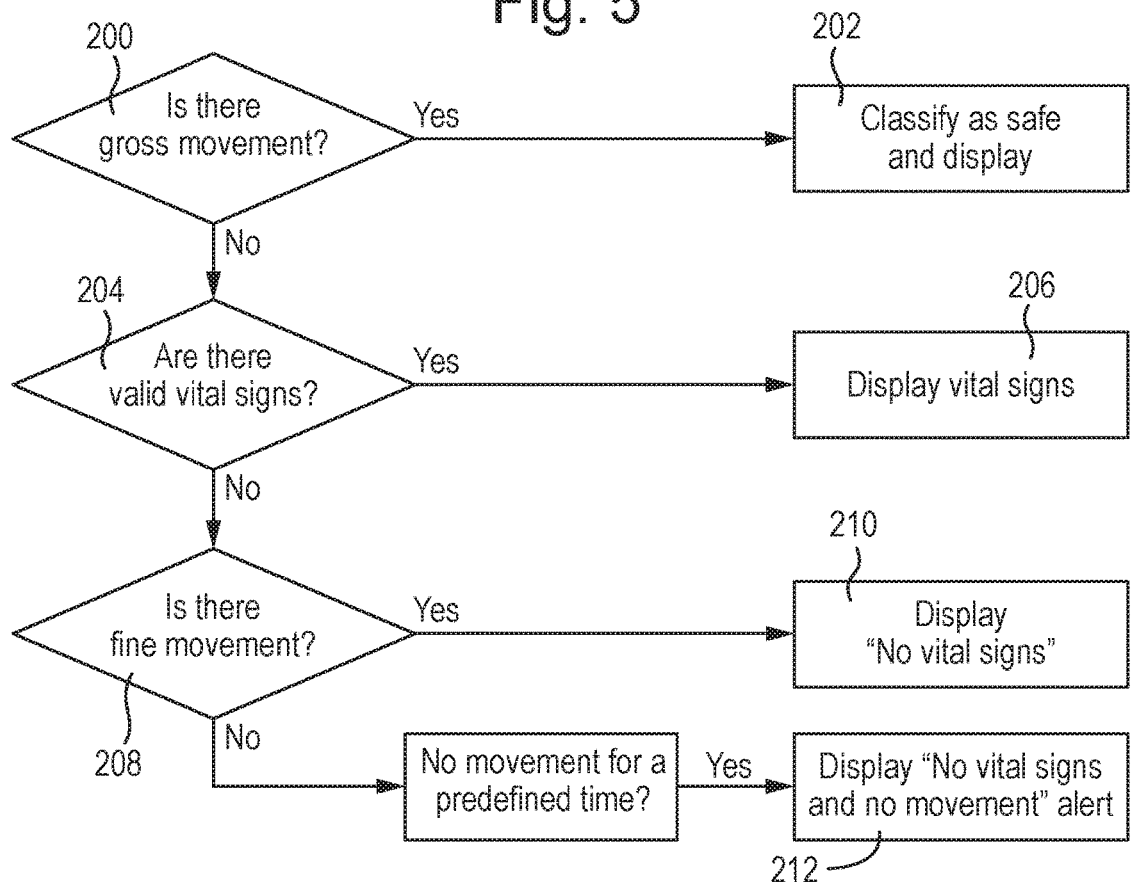
Figure 6:
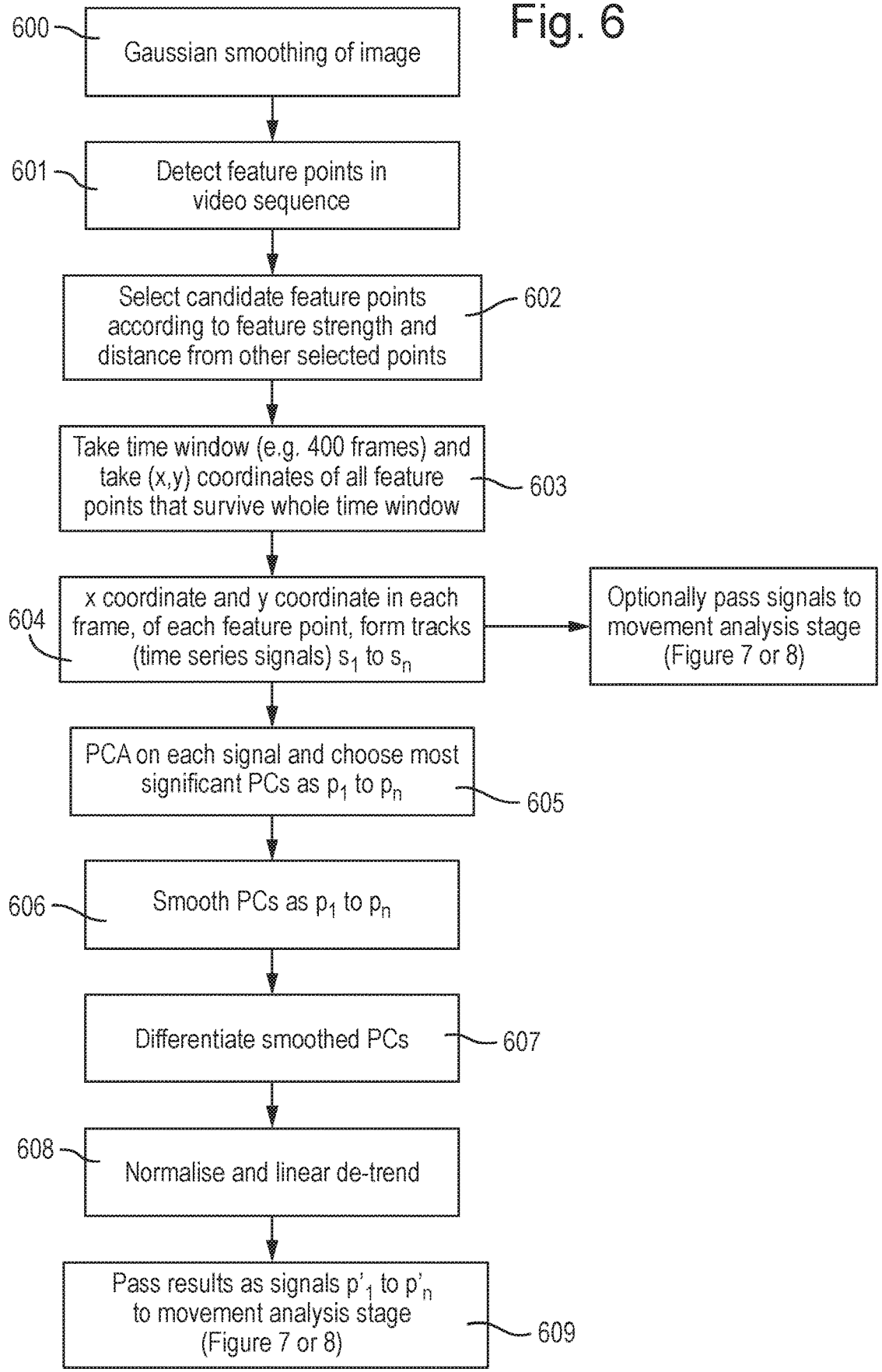
Figure 7:
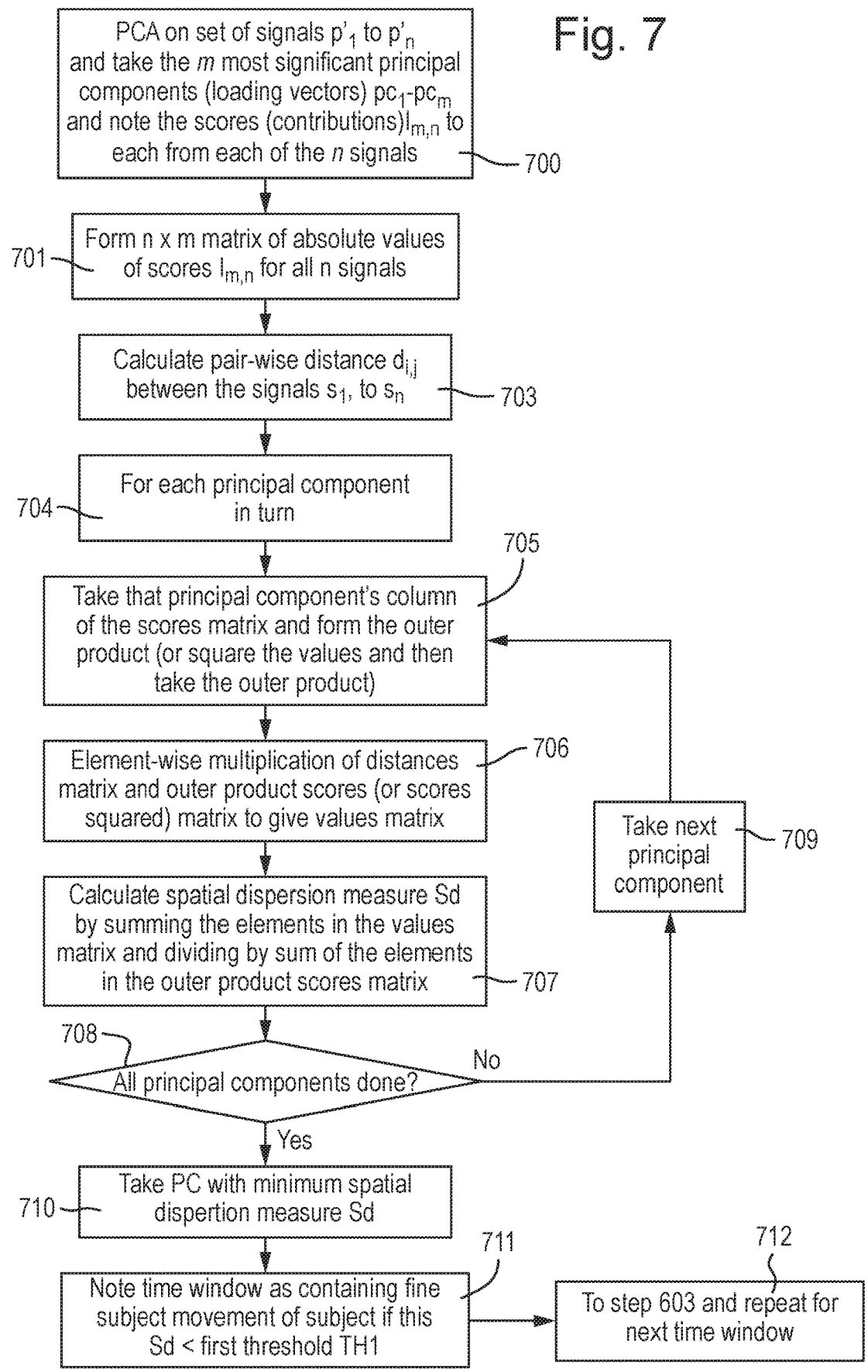
Figure 8:
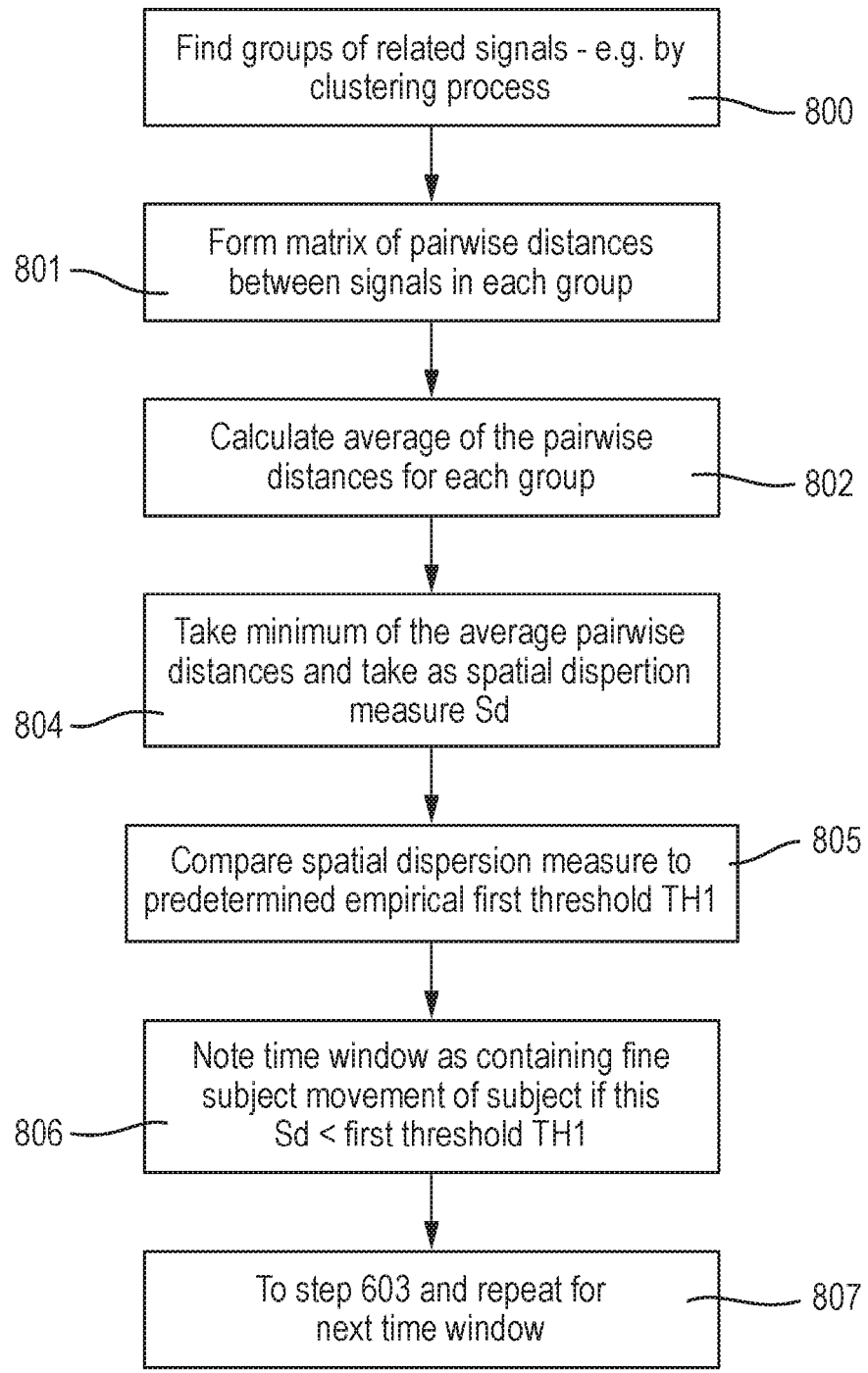
Figure 9:
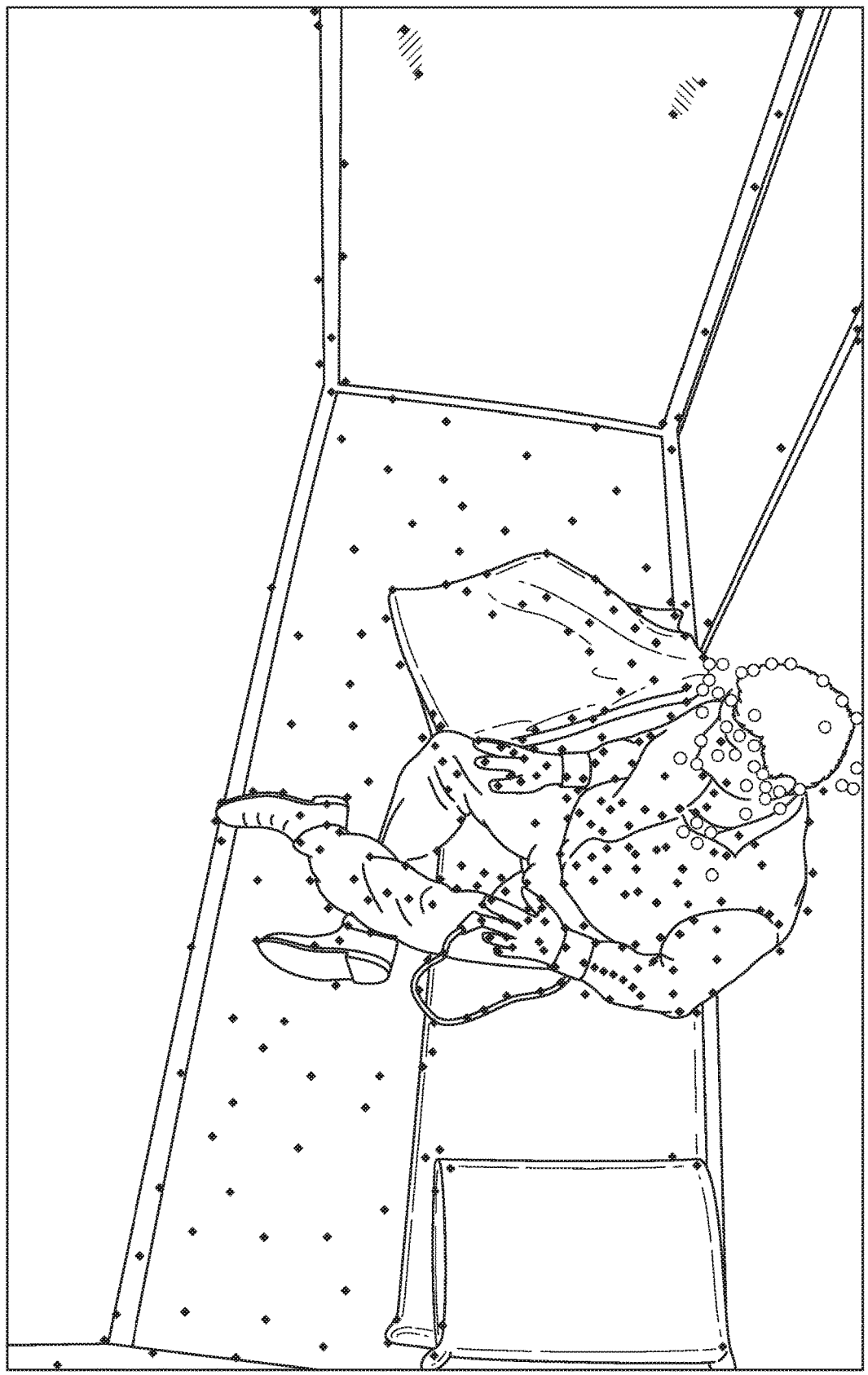
Figure 10:
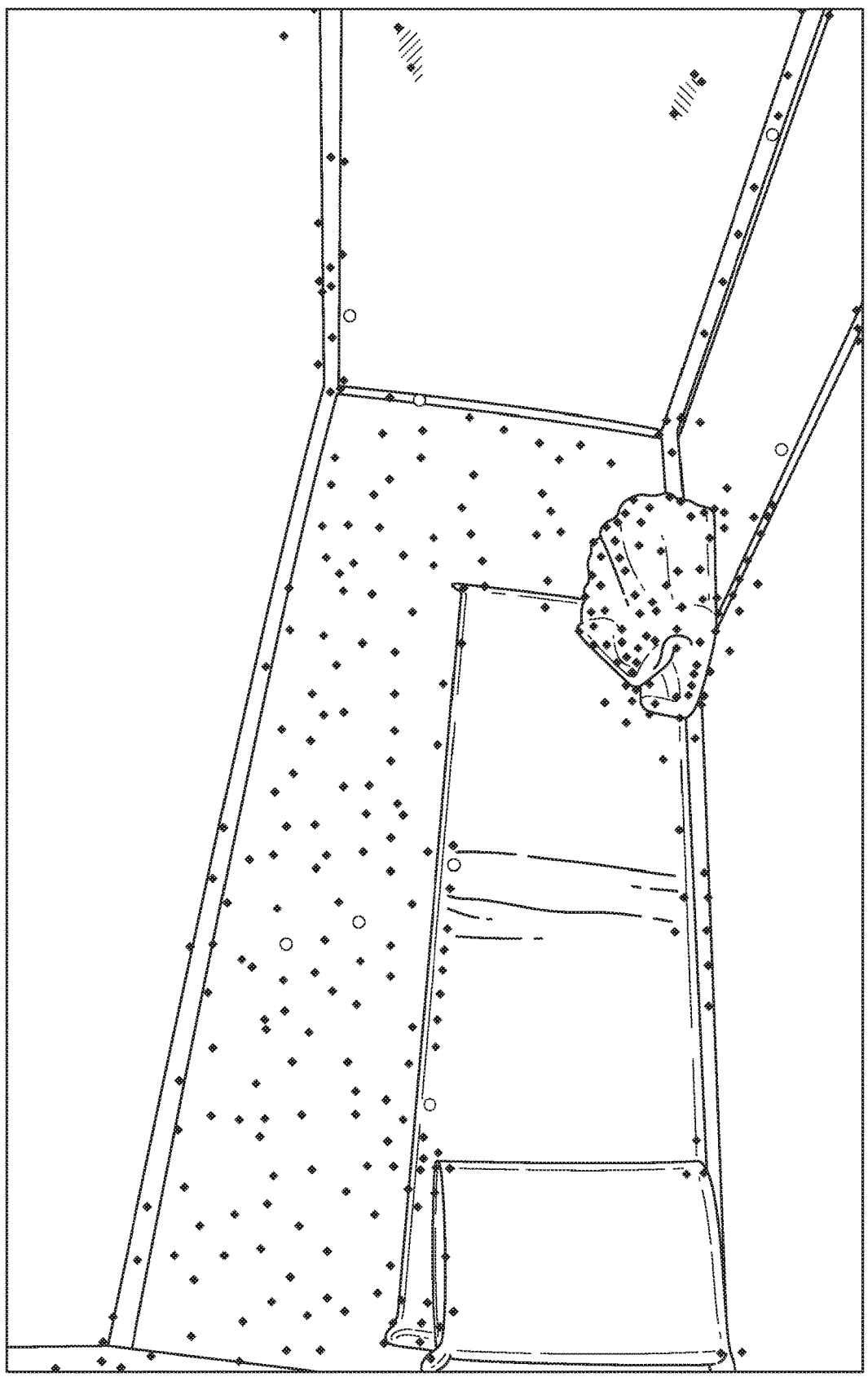

FIG. 1 illustrates schematically a welfare monitoring system including an image analysis apparatus in accordance with an embodiment of the invention;

FIG. 2 schematically illustrates example image frames from a video image;

FIG. 3 schematically illustrates track signals extracted from a video image;

FIG. 4 schematically illustrates a vital signs monitoring method;

FIG. 5 schematically illustrates parts of the vital signs monitoring method of FIG. 4;

FIG. 6 schematically illustrates processing of movement signals from the video image in accordance with one embodiment of the invention;

FIG. 7 schematically illustrates processing of video signals in accordance with an embodiment of the invention;

FIG. 8 schematically illustrates processing of video signals in accordance with another embodiment of the invention;

FIG. 9 is a screenshot of a scene including a human subject and with tracked feature points indicated together with their principal component score with the lowest spatial dispersion; and FIG. 10 is a screenshot of a scene not including a human subject and with tracked feature points indicated together with their principal component score with the lowest spatial dispersion.

The invention will be described as applied to a vital signs/welfare monitoring system usable in a secure room environment, for monitoring the welfare of subjects such as patients or prisoners who are restrained in a secure room. FIG. 1 schematically illustrates an apparatus in accordance with an embodiment of the invention being used to monitor a subject 3 in a room 1. The room 1 can be a secure room such as a police or prison cell or some other detention facility, or could be a room in a hospital or other care facility such as a care home, sheltered accommodation or the subject's own home. The subject 3 is monitored by a video camera 5 whose output is processed by a video signal processor 7 and the results of the analysis are displayed on a display 9 which is visible to staff of the facility. The video signal processor 7 may be a dedicated signal processor or a programmed general purpose computer. The room may be naturally lit and/or may be artificially illuminated using a visible light source 11 or infrared light source 13.

The video camera 5 is a standard digital video camera outputting video data in the form of a sequence of image frames, each frame being an image of the scene in the form of a pixel array of intensities in red, green, blue channels. The red, green and blue channels also give a response in the infrared range allowing the production of an infra-red (IR) image useful when the room is dark. Video cameras of this type typically output the signal at fifteen or twenty frames per second, though of course different frame rates are possible.

The display 9 preferably displays the video image of the room and also displays automatically-generated information regarding the health or safety of the subject 3. In this embodiment this information is preferably:—
  Whether movement is detected.
  Whether vital signs are being acquired.
  Whether the subject is judged to be safe.
  Current values of estimated vital signs such as heart rate and breathing rate.
  Whether no vital signs have been detected and the time for which no vital signs have been detected.
  A no movement and no vital signs alert or alarm.

Staff monitoring the subject by way of the display 9 can therefore tell at any given time whether the subject is considered safe, for example because they are moving or because the vital signs are being detected and are in a physiologically normal range, or whether the system is unable to detect vital signs and safe movement is detected (and for how long that situation has persisted), or that no vital signs and no movement is detected, in which case an alert is generated prompting staff to monitor the subject. If the lack of vital signs detection persists for more than a configurable amount of time an alert may be generated to call on staff to check the subject. Alerts can included a range of electronic notification methods including automated telephone message, pager, SMS, as well as indication on the display 9 with the alert containing the condition and location of the subject and the condition being alerted.

FIG. 4 schematically illustrates the overall processing by video signal processor 7. In this embodiment the video analysis system 7 analysis the video image captured by camera 5 to detect in step 104 the vital signs of the subject (such as heart rate and breathing rate), and in parallel in step 102 analyses the video image to detect whether it contains gross movement of the subject, fine movement of the subject or no movement of the subject. As mentioned above gross movement is, for example, the subject walking or running or jumping, and in the case of gross movement it is normal to suspend analysis of the video to detect vital signs such as heart rate or breathing rate because it is difficult to perform such analysis in the presence of gross movement. As illustrated in FIG. 4, therefore, in step 100 the video is acquired and is subject both to movement detection in step 102 and vital signs detection or estimation in step 104. Step 104 may be suspended if gross movement is detected in the video sequence. The results of the movement detection and vital signs detection are interpreted and validated in step 106 and displayed in step 108 on display 9.

FIG. 5 schematically illustrates the interpretation and validation step 106. In step 200 the first determination is made as to whether gross subject movement is present in the video image. If gross movement is present then the subject status is classified as safe and a corresponding display made in step 202. If no gross movement is present then, firstly, if valid vital signs have already been detected (in the previous pass through the process), then these are displayed in step 206. If not, then a determination is made as to whether fine movement is present in the image. If fine movement is present, but no vital signs have been detected, then a display "no vital signs" is made in step 210. On the other hand if no fine movement is detected, and if this situation persists for a predetermined time, then a display "no vital signs and no movement" alert is made in step 212, which may indicate that the subject is in a serious condition.

It will be understood, therefore, that an important part of the process is determining in step 208 whether or not fine movement is present. If some image artefact is mistaken for fine movement of the subject, the system will not report correctly on the status of the subject. The present invention is therefore designed to improve the reliability of the automated detection of fine movement of a subject in a scene being video imaged, and to distinguish such movement from image artefacts such as pixel noise.

The image processing in accordance with one embodiment of the invention is illustrated in FIGS. 6, 7 and 8.

This embodiment of the invention is based on detecting fine movement by tracking movement of image features in the video image of the room. Thus the video camera 5 provides an image not only of the subject, but of the whole scene, i.e. also of the room and articles in it. The movement may be movement of parts of the body of the subject 3 or movement of articles associated with or in contact with the subject such as clothing or bedding.

As illustrated in FIG. 6, in a first step 600 the image is smoothed—e.g. using Gaussian smoothing and then in step 601 image features (also known as feature points) in the video sequence are detected. This may be conducted on a grayscale image formed from the RGB channels, e.g. by averaging them.

There are many ways of detecting feature points in a video sequence using off-the-shelf video processing algorithms. For example, feature points consisting of recognisable geometrical shapes such as corners or edges can be detected based, for example, on the gradient of intensity variation in one or two dimensions and any such algorithm which identifies image feature points can be used in this invention. Feature point detecting algorithms usable with this invention are ones which detects Harris features, SIFT features, ORB/SURF features for example.

Most feature point detecting algorithms will generate many more candidate feature points than are required. For the purposes of the present invention feature points are preferred which are strong and relatively evenly spaced. This is achieved in an iterative process in step 602 by selecting feature points found by the feature point detecting algorithm based on two metrics: one based on the strength of the point as measured and output by the feature point detecting algorithm (the strength might be, for example the intensity gradient, but all algorithms output some measure of strength), and one which is the distance to already selected feature points. Thus a first feature point from those generated by the feature point detecting algorithm is selected, e.g. the strongest, and then the distance from all other feature points to the selected feature point is measured. A weighted combination of each feature point's strength and distance to the already selected point is found, and the one with the highest value is selected. The minimum distances of the remaining feature points to the closest of the two already selected feature points are recalculated, the weighted combination of strength and minimum distance recalculated, and the feature point with the highest value is selected. This process of calculating distances to the closest of the already selected feature points and selecting the one with the highest combination of strength and distance continues until the desired number of feature points, e.g 400 or 600 has been selected. This process of selecting feature points can be repeated any time the number of feature points falls below a desired value as a result of some subsequent step, e.g sometimes features can fail to be successfully tracked from one frame to another resulting in a decrease in the number of feature points being tracked. To track the detected features from one frame to the next a standard feature tracking algorithm such as KLT tracking may be used.

In step 603 a sequence of video frames is taken for processing as a batch, such as four hundred frames (corresponding to twenty seconds of video at a conventional frame rate of twenty frames per second). The x coordinates and y coordinates of all of the selected feature points that are present in all one four hundred frames of the sequence are then taken. The variation in position (x coordinate and y coordinate) of each feature point through the frame sequence is then taken as a track signal to be processed. Thus step 104 will output n track signals where n is the number of feature points tracked (e.g. 600). FIG. 2 illustrates schematically three frames of a video image frame sequence, the frames being at t−1, t and t+1, with a number of detected feature points 20, 21, 22 in them. Each detected feature 20, 21, 22 point will contribute an x, y coordinate pair and the variation of the x and y coordinate of each of these pairs through the sequence (i.e. as a function of time) is taken as a track signal.

The variation in position with time of each feature point is a 2D time signal. For the subsequent processing steps it is desired to have a 1D time signal. One option for creating such a signal, as illustrated in step 605, is to perform principal component analysis on each individual signal and to choose the most significant principal component as the new track signal. Alternatively, the variation in x coordinate with time and the variation in y coordinate with time of each feature point could be used as separate track signals—each feature point track contributing two track signals to the subsequent processing steps.

The track signals my be passed as they are to the movement analysis stage, but in this embodiment the track signals are subject to further signal conditioning to improve subsequent processing and dependent on the requirements of that processing—in particular its sensitivity to noise. In particular techniques which look at the signals' linear similarities, such as linear principal components analysis or clustering using Pearson correlation mentioned below, are sensitive to noise in the signals and thus benefit to signal conditioning. However alternative methods which look at mutual information or non-linear PCA can omit such signal conditioning.

As one example of signal conditioning, in step 605 the track signals are smoothed using a standard smoothing filter such as a Savitsky-Golay filter or a Gaussian smoothing filter which are effective to remove pixel noise. Then in step 606 the smoothed signals are differentiated to remove non-linear trends and in step 607 the results are normalised to have a standard deviation equal to one. The result is to provide well-conditioned track signals for the subsequent processing steps. Thus in steps 608 the resulting track signals $p'_1$ to $p'_n$ are passed to the movement analysis stage of FIG. 7 or 8.

The aim of the processing in FIG. 7 or 8 is to examine the spatial dispersion of the main feature movements in the image. In particular, it examines whether the main movement signals are concentrated in one part of the image (and thus suggestive of movement of a subject in scene), or whether they are spread out all over the image which is likely to be indicative of noise or some other image artefact. In particular, a spatial dispersion measure which is based on the combination of the distance between pairs of track signals in the image and the similarity or commonality of the track signals of the pair is calculated. If track signals having a high commonality or similarity are closely grouped—it is suggestive of subject movement. If they are well-dispersed or there is little commonality, it is less suggestive of subject movement.

In a first embodiment as shown in FIG. 7 this assessment is made by finding the most significant principal components of the whole set of track signals and examining the distance between the track signals with the strongest scores in principal components. In particular, a spatial dispersion measure which is based on the combination of the distance between pairs of track signals in the image and the scores of the most significant principal components of the track signals of the pair is calculated.

FIG. 7 illustrates one way of calculating a spatial dispersion measure. In step 700 principal component analysis is formed on the whole set of track signals $p'_1$ to $p'_n$ to find the m most significant principal components $pc_1$ to $pc_m$ (m=16, for example). For each of the m principal components the principal component analysis will return a score $l_m$, of that principal component for each of the n track signals. In step 701 an n by m matrix of the absolute values of the scores from all n track signals for all m principal components $pc_1$ to $pc_m$ is formed.

$$\begin{pmatrix} l_{p'1,pc1} & \cdots & l_{p'1,pcm} \\ \vdots & \ddots & \vdots \\ l_{p'n,pc1} & \cdots & l_{p'n,pcm} \end{pmatrix} \quad (1)$$

In step 703 the distance between all pairs of the n signals in the image is calculated and formed into a distances matrix. The distance is measured in pixels and it may be the average distance between the tracked features in the sequence of image frames under consideration, or alternatively the distance between the tracked features in any one of the frames (for example the last frame, the middle frame or the first frame for convenience). As the distance between a tracked feature and itself is zero, the matrix will have a zero diagonal.

$$\begin{pmatrix} 0 & \cdots & \delta_{s1,sn} \\ \vdots & \ddots & \vdots \\ \delta_{sn,s1} & \cdots & 0 \end{pmatrix} \quad (2)$$

The distances matrix (2) is an n by n matrix giving the distances between every pair of tracked feature points. If this is combined with the knowledge of which track signals have a greater absolute score for the more significant principal components, the result is an indication of the spatial dispersion of the movement signals in the image.

To calculate such a spatial dispersion measure steps 704 to 709 are conducted for each of the m principal components. Thus in step 705 one principal component's column from the scores matrix (1) is taken;

$$\begin{pmatrix} l_{p'1,pc1} \\ \vdots \\ l_{p'n,pc1} \end{pmatrix} \quad (3)$$

(this gives the contribution to that principal component by each of the n signals) and its outer product is formed (i.e. it is dot multiplied by its transpose) to form an n by n matrix.

$$\begin{pmatrix} l_{p'1,pc1} \\ \vdots \\ l_{p'n,pc1} \end{pmatrix} \cdot (l_{p'1,pc1} \ \cdots \ l_{p'n,pc1}) = \quad (4)$$

$$\begin{pmatrix} l^2_{p'1,pc1} & l_{p'1,pc1} \cdot l_{p'2,pc1} & \cdots & \cdots & l_{p'1,pc1} \cdot l_{p'n,pc1} \\ l_{p'2,pc1} \cdot l_{p'1,pc1} & & & & l_{p'2,pc1} \cdot l_{p'n,pc1} \\ \vdots & \vdots & \cdots & \cdots & \vdots \\ \vdots & \vdots & \cdots & \cdots & \vdots \\ l_{p'n,pc1} \cdot l_{p'1,pc1} & l_{p'n,pc1} \cdot l_{p'2,pc1} & \cdots & \cdots & l^2_{p'n,pc1} \end{pmatrix}$$

Then in step 706 an element-wise multiplication of the n by n distances matrix (2) and the n by n outer product (4) from step 705 is performed. By an element-wise multiplication is meant that each element of one matrix is multiplied by its corresponding element in the other matrix. This results in n by n values, each of which is equal to the product of the distance between two tracked features and the principal component score of each of the two tracked features for the principal component under consideration. In step 707 all of the resulting values are summed and the sum is divided by the sum of the elements of the outer product of the principal component scores matrix. The result is a spatial dispersion measure which is higher if the distance between tracked features contributing strongly to the principal component are spaced far apart, and lower if they are spaced closed together.

In step 708 it is checked whether a spatial dispersion measure has been obtained for all principal components, and if not steps 705 to 707 are repeated for the next principal component until all m of them have had a spatial dispersion measure calculated.

Remembering that the spatial dispersion measure is low if the tracked movements contributing to the most significant principal components are close together (and thus more likely to represent movement of a subject in the image), in step 710 the spatial dispersion measures for each of the principal components are compared and the minimum of the spatial dispersion measures is taken. In step 711 this minimum spatial dispersion measure is compared to a threshold TH1 and if it is less than the threshold then the section of video under consideration (current time window of step 603) is categorised as containing fine movement of the subject. Processing then returns to step 603 so that the process can be repeated for the next time window. Typically the window is moved on by a small fraction of the window length, for example a 20 second time window may be moved on by one second each time.

The threshold TH1 in step 711 is predetermined and is set as an empirical threshold in a training or tuning process by examining video images of a scene containing gross movement, fine movement and no movement (and naturally-present random noise) and setting the threshold to distinguish fine movement from noise.

FIG. 8 illustrates an alternative way of determining a spatial dispersion measure. Firstly, in step 800 the track signals from the processing of FIG. 6 are grouped. The signals are grouped according to their similarity. One variety of techniques for performing such grouping is clustering, which may be hard or soft clustering, based on some similarity measurement. For example, standard techniques such as K-means clustering, spectral clustering or clustering on a matrix or hierarchical clustering may be used. In hard clustering each signal is allocated only to one cluster. In soft clustering signals may be regarded as having a certain percentage of belonging to several different clusters.

As for the measurement of similarity, the signals maybe subjected to clustering according to the absolute values of their correlation (e.g. Pearson correlation, or Spearman or Kendall correlation) or on the basis of their mutual information.

Then in step 801 a matrix is formed of the pairwise distances between the signals in a subset of the groups comprising those groups which satisfy some suitability criterion such as containing more than a predetermined number of tracks or being one of the largest N groups where N is predetermined. In step 802 the average of the pairwise distances within each of the subset of groups is calculated and this average of the pairwise distances is taken as a spatial dispersion measure. In step 804 the minimum of the average distances is taken and in step 805 it is compared to a threshold TH1, which is an empirical predetermined threshold set in the same way as the threshold TH1 in step 711. In step 806 the time window of frames is noted as containing fine subject movement if the spatial dispersion measure is less than the threshold TH1. Then in step 807 the processing passes back to step 603 to repeat for the next time window of frames.

The result of the processing above is an improved and more robust detection of fine movement of a subject, such as a human or animal, in the video image.

FIG. 9 is a screenshot illustrating the spatial dispersion measures calculated for feature points for a video sequence where a human subject is in a room. The black squares show feature points which are detected and tracked through the sequence but which have a low score for the principle component (loadings vector) with the lowest spatial dispersion measure. On the other hand the pink circular points are tracked features which have a high score for the loadings vector with the lowest spatial dispersion measure. It can be seen that the pink points are highly associated with the human subject. Thus the minimum spatial dispersion measure is small because the pink marked points are close together and it is below the threshold TH1. This scene therefore includes a subject which is associated with fine movement.

By way of a comparison, FIG. 10 illustrates the same scene, but with no human subject in the room. Again the pink circular points are those tracked features which have a high score for the loadings vector with the lowest spatial dispersion. However, these points are very far apart, distributed across the scene, and so the smallest spatial dispersion measure in this scene is above the threshold TH1.

The invention claimed is:

1. A method of determining whether a video image of a scene contains movement of a subject within the scene, comprising the steps of:
acquiring a sequence of image frames forming the video image;
detecting movement of a plurality of image features through the sequence of image frames to form a corresponding plurality of movement signals;
analysing the movement signals to find related movement signals, these being signals analysed as likely to relate to the same movement source;
calculating a spatial dispersion measure for the related movement signals, the spatial dispersion measure representing the spatial dispersion in the image of the related movement signals;
comparing the lowest of the calculated spatial dispersion measures with a predetermined first threshold, and if it is lower than the predetermined first threshold determining that video image as containing subject movement.

2. The method according to claim 1 wherein the step of analysing the movement signals to find related movement signals comprises analysing the movement signals using a blind signal separation method.

3. The method according to claim 2 wherein the blind signal separation method is selected from principal component analysis, independent component analysis or clustering.

4. The method according to claim 1 wherein the step of detecting movement of a plurality of image features through the sequence of image frames comprises detecting a plurality of image features within each image frame and tracking the position of the plurality of image features through the sequence of image frames to form a corresponding plurality of track signals constituting said movement signals.

5. The method according to claim 1 wherein the step of detecting movement of a plurality of image features through the sequence of image frames comprises superpixel detection and tracking or dense optical flow analysis.

6. The method according to claim 1 wherein the step of analysing the movement signals to find related movement signals comprises finding analytically-similar movement signals.

7. The method according to claim 1 wherein the step of analysing the movement signals to find related movement signals comprises finding temporally-similar movement signals.

8. The method according to claim 7 wherein the step of analysing the movement signals to find related movement signals comprises analysing the frequency content of the movement signals.

9. The method according to claim 1 wherein the step of analysing the movement signals to find related track signals comprises finding movement signals which share common components.

10. The method according to claim 9 wherein the step of analysing the movement signals to find related movement signals comprises finding the strength of their common components.

11. The method according to claim 1 wherein the step of analysing the movement signals to find related movement signals comprises analysing the movement signals to find principal components of the plurality of movement signals and determining for each obtained principal component the score of each movement signal for that principal component.

12. The method according to claim 11 wherein the step of calculating a spatial dispersion measure for the related movement signals comprises for each of a plurality of the most significant of the obtained principal components calculating the spatial dispersion measure representing the spatial dispersion in the image of the movement signals with a strong score in that principal component.

13. The method according to claim 11 wherein the step of comparing the lowest of the calculated spatial dispersion measures with a predetermined first threshold comprises comparing the lowest of the spatial dispersion measures of the said plurality of principal components with a predetermined first threshold, and if it is lower than the predetermined first threshold determining that video image as containing subject movement.

14. The method according to claim 11 wherein the spatial dispersion measure for each principal component is calculated from the scores of each movement signal for that principal component and a distance in the video image between the movement signals contributing to that principal component.

15. The method according to claim 14 wherein the spatial dispersion measure for a principal component is calculated from a product of the scores of each movement signal for the principal component and a distance in the image between the movement signals.

16. The method according to claim 15 wherein the spatial dispersion measure for each principal component is calculated by, for a plurality of different pairs of the movement signals, calculating the product of the scores of each of the pair of movement signals for that principal component and a distance in the video image between the pair of movement signals.

17. The method according to claim 16 wherein the spatial dispersion measure for each principal component is calculated by calculating the sum of all the products of the scores of each of the pair of movement signals for that principal component and a distance in the video image between the pair of movement signals, and dividing it the sum by the sum of all the scores of each of the pair of movement signals for that principal component.

18. The method according to claim 1 wherein the spatial dispersion measure is determined from the distances in the image between the movement signals, the distances being one of: the average over the sequence of image frames of the distance between the image features forming the movement signals, the distance in a predetermined frame of the sequence between the image features forming the movement signals, the predetermined frame being one of: the last frame, the middle frame, the first frame.

19. The method according to claim 1 wherein the step of analysing the movement signals to find related movement signals comprises performing clustering on the movement signals and the spatial dispersion measure is calculated for each cluster.

20. The method according to claim 1 further comprising the step of conditioning the movement signals before the step of analysing the movement signals to find related movement signals.

21. The method according to claim 20 wherein the step of conditioning the movement signals comprises at least one of noise reduction and removing non-linear trends.

22. The method according to claim 21 wherein the step of conditioning the movement signals comprises at least one of smoothing the movement signals to reduce pixel noise and differentiating the movement signals to remove non-linear trends.

23. An apparatus for monitoring a subject in a room to provide status or alerting of a subject's condition, the apparatus comprising:
- a video camera configured to capture a video image sequence of the room;
- a data processor configured to automatically process the video image sequence to determine whether a video image of a scene contains movement of a subject within the scene in accordance with the method of claim 1; and
- a display or other output device which under the control of the data processor outputs a visible or audible indication of the determination.

24. The computer program comprising program code means for executing on a computer system the processing of a captured video image sequence of a scene to automatically determine whether the video image sequence contains movement of a subject within the scene, the method being in accordance with claim 1.

\* \* \* \* \*